United States Patent
Eberling et al.

(10) Patent No.: US 8,840,197 B2
(45) Date of Patent: Sep. 23, 2014

(54) HAND CONTROL BRAKE VALVE

(75) Inventors: Charles E. Eberling, Wellington, OH (US); Thanh Ho, Brunswick, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 117 days.

(21) Appl. No.: 13/157,565

(22) Filed: Jun. 10, 2011

(65) Prior Publication Data

US 2012/0313028 A1 Dec. 13, 2012

(51) Int. Cl.
*B60T 15/04* (2006.01)
*F16K 1/00* (2006.01)

(52) U.S. Cl.
CPC .................................. *F16K 1/00* (2013.01)
USPC ............................ 303/56; 303/118.1; 303/89

(58) Field of Classification Search
USPC ........ 303/118.1, 40, 56, 89; 251/94; 137/596, 137/596.1; 74/54
See application file for complete search history.

(56) References Cited

U.S. PATENT DOCUMENTS

| | | |
|---|---|---|
| 3,666,324 A | 5/1972 | Page et al. |
| 3,972,398 A | 8/1976 | Chamberlain |
| 4,865,078 A | 9/1989 | Ensign |
| 5,226,692 A | 7/1993 | Eberling |
| 5,964,449 A | 10/1999 | Goettel et al. |
| 7,204,563 B2 | 4/2007 | Soupal |
| 7,575,285 B2 | 8/2009 | Bobby et al. |

FOREIGN PATENT DOCUMENTS

| | | |
|---|---|---|
| DE | 3428214 A1 | 2/1986 |
| EP | 0068723 A2 | 1/1983 |
| EP | 1571060 A1 | 9/2005 |

OTHER PUBLICATIONS

Bendix TCS-9000 Control Brake Valve, Bendix Service Data SD-3-3674, Jun. 2005.
International Search Report issued for counterpart WO Patent Application No. PCT/US2012/041600, mailed Aug. 24, 2012.
Written Opinion issued for counterpart WO Patent Application No. PCT/US2012/041600, mailed Aug. 24, 2012.

*Primary Examiner* — Robert A Siconolfi
*Assistant Examiner* — Vu Q Nguyen
(74) *Attorney, Agent, or Firm* — Calfee, Halter & Griswold LLP

(57) ABSTRACT

A vehicle hand control brake valve includes a piston, positioned based on an engagement of a vehicle parking brake, a service brake actuation valve, and a control mechanism. The control mechanism mechanically interacts with the service brake actuation valve to set a position of the service brake actuation valve. A level of actuation of vehicle service brakes is set based on the position of the service brake actuation valve. The service brake actuation valve is set to a position to actuate the service brakes when the control mechanism is set to a latch position. The control mechanism only is latched in the latch position when the vehicle parking brake is engaged.

21 Claims, 6 Drawing Sheets

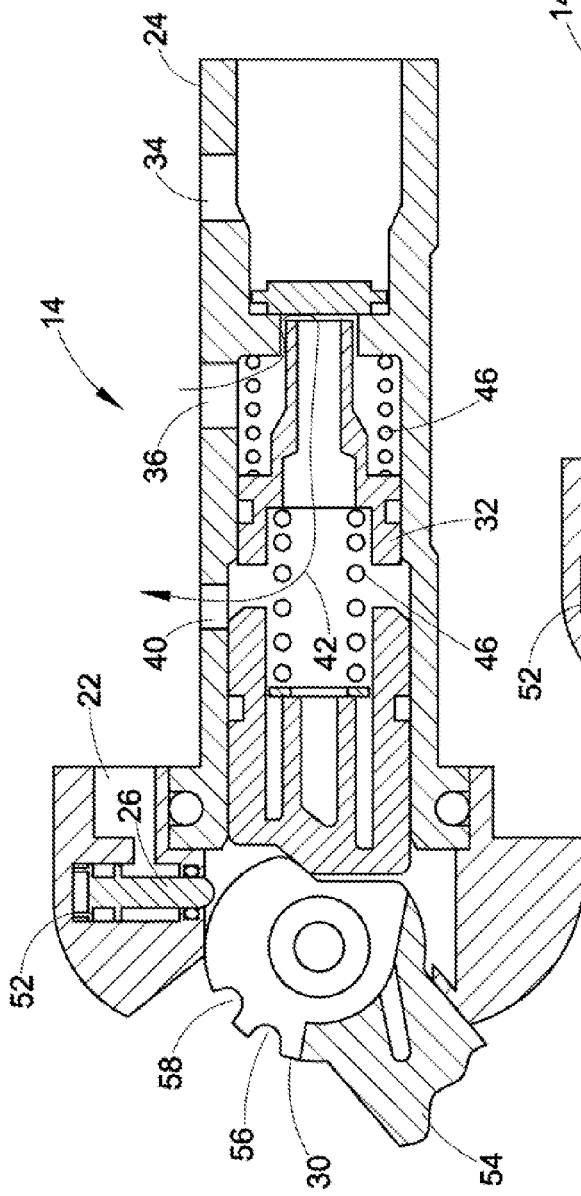
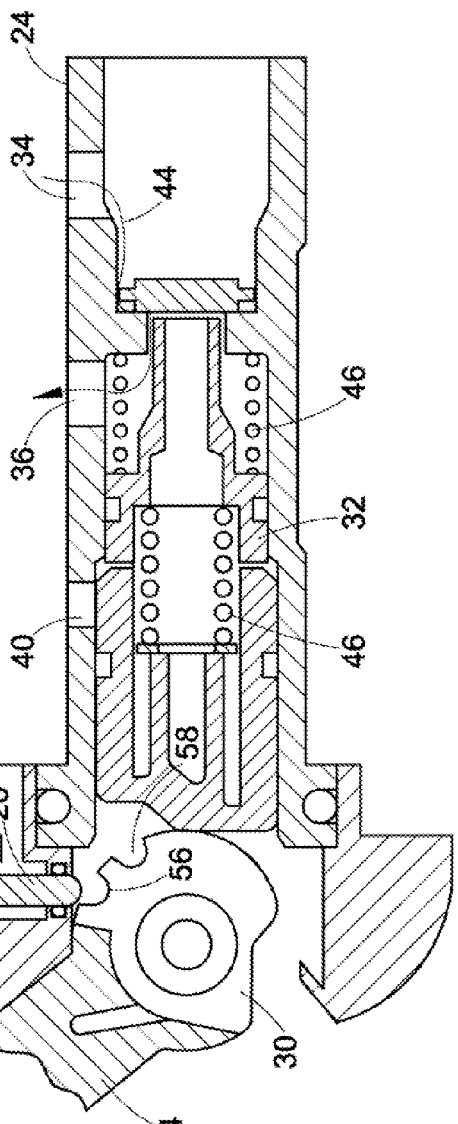
FIG. 2
FIG. 3

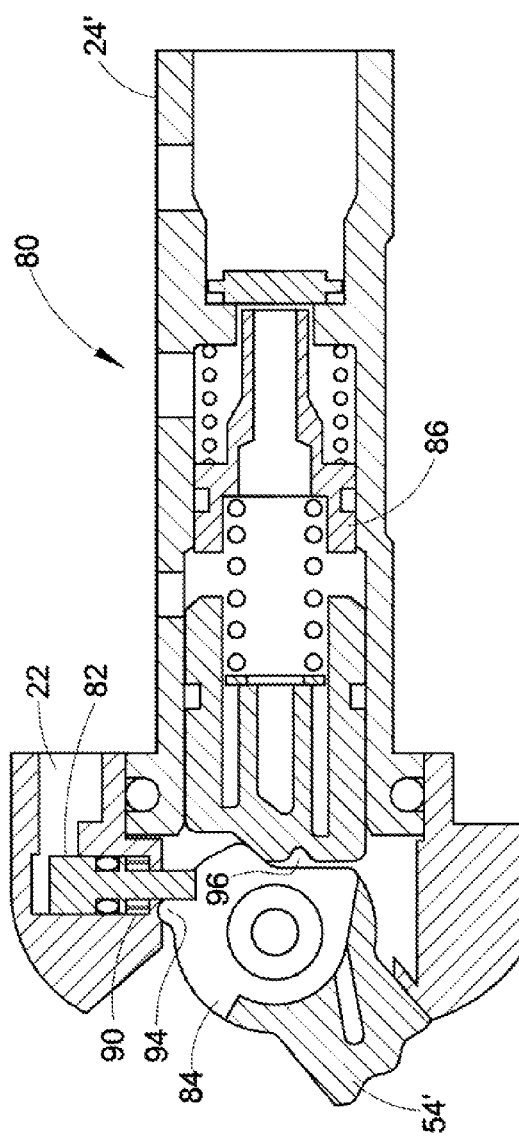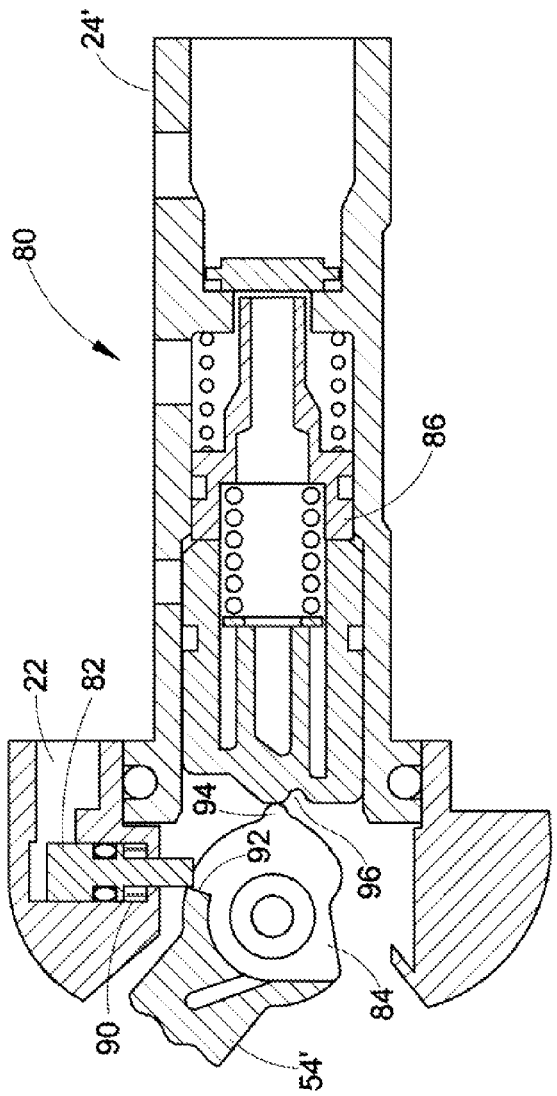

HAND CONTROL BRAKE VALVE

BACKGROUND

The present invention relates to a hand control brake valve. It finds particular application in conjunction with latching a hand control brake valve for applying vehicle service brakes on a trailer and will be described with particular reference thereto. It will be appreciated, however, that the invention is also amenable to other applications.

It may be required for a driver of a tractor-trailer combination vehicle to make a pre-trip inspection. Typically, to make a pre-trip inspection, the driver starts the engine and then gets out of the vehicle to walk around the vehicle to make sure the vehicle is in safe operating condition. The driver checks such things as the tires, the couplings connecting the braking system of the trailer and tractor, the stop lights, etc. The pre-trip inspection requires that a trailer service brake application be effected so that couplings and the stop lights may be checked. In existing braking systems, the service actuation is effected by operation of the hand control valve.

Current hand control valve designs may result in unintended movement of the vehicle after the hand control valve is set to effect the service brake actuation. For example, after the driver begins walking around the vehicle (and leaves the immediate vicinity of the hand control valve), the hand control valve may "slip" out of the position in which the service brakes are actuated. In this example, once the unintended release of the service brakes occurs, the vehicle may begin to move. Such movement of the vehicle may be dangerous and cause injury.

The present invention provides a new and improved apparatus which addresses the above-referenced problems.

SUMMARY

In one embodiment, a vehicle hand control brake valve includes a piston, positioned based on an engagement of a vehicle parking brake, a service brake actuation valve, and a control mechanism. The control mechanism mechanically interacts with the service brake actuation valve to set a position of the service brake actuation valve. A level of actuation of vehicle service brakes is set based on the position of the service brake actuation valve. The service brake actuation valve is set to a position to actuate the service brakes when the control mechanism is set to a latch position. The control mechanism only is latched in the latch position when the vehicle parking brake is engaged.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 2 illustrates a simplified component diagram of an exemplary tractor hand control valve in a release position in accordance with a first embodiment of an apparatus illustrating principles of the present invention;

FIG. 3 illustrates a simplified component diagram of an exemplary tractor hand control valve in an unlatched delivery position in accordance with the first embodiment of an apparatus illustrating principles of the present invention;

FIG. 5 illustrates a simplified component diagram of an exemplary tractor hand control valve in a release position in accordance with a second embodiment of an apparatus illustrating principles of the present invention;

FIG. 6 illustrates a simplified component diagram of an exemplary tractor hand control valve in an unlatched delivery position in accordance with the second embodiment of an apparatus illustrating principles of the present invention;

DETAILED DESCRIPTION OF ILLUSTRATED EMBODIMENT

Figure 1:
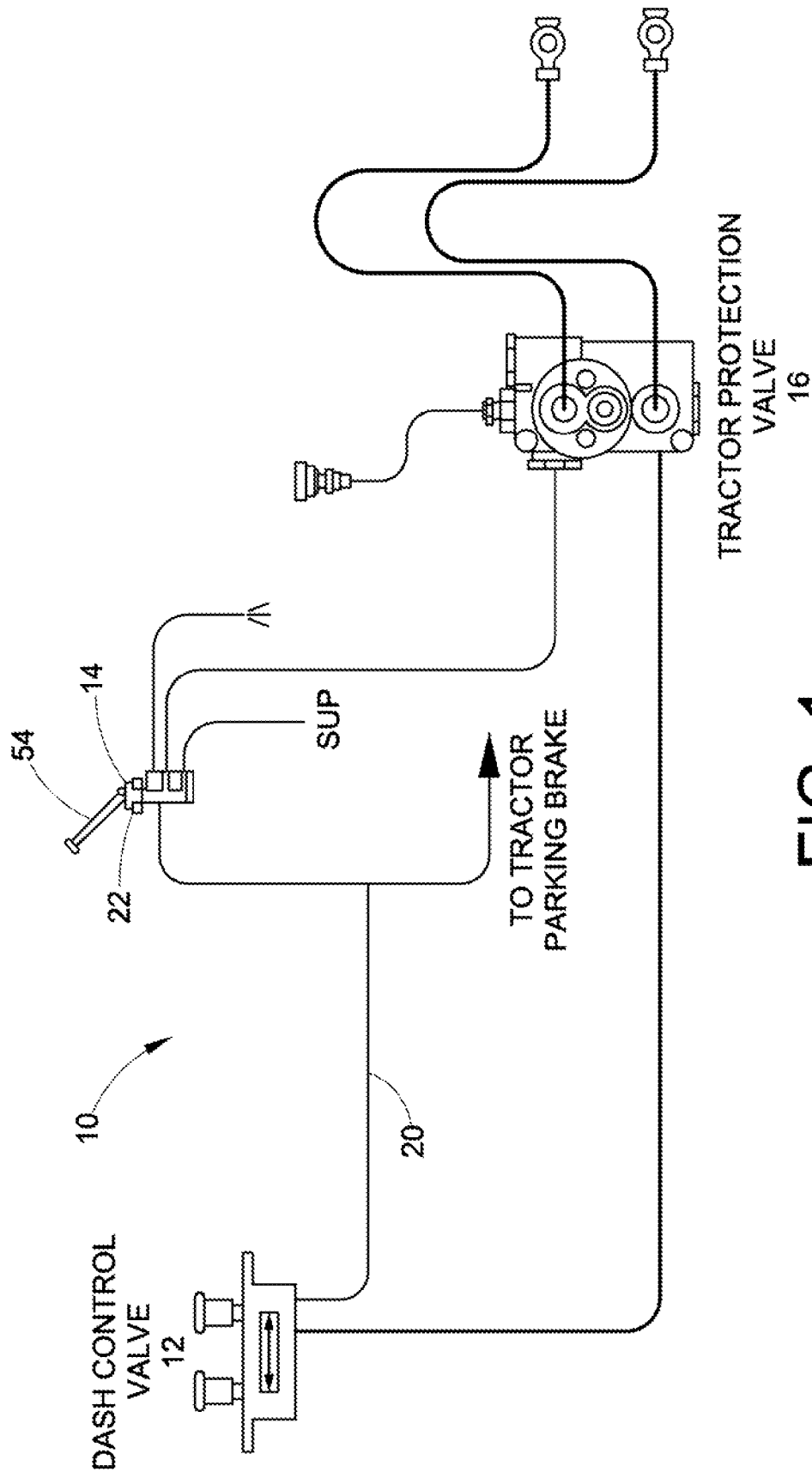
FIG. 1 illustrates a simplified component diagram of an exemplary brake system in accordance with one embodiment of an apparatus illustrating principles of the present invention.

With reference to FIG. 1, a simplified component diagram of an exemplary brake system 10 of a vehicle is illustrated in accordance with one embodiment of the present invention. The brake system 10 includes a dash control valve 12, a hand control valve 14, and a tractor protection valve 16. An air line 20 from a delivery port of the dash control valve 12 fluidly communicates with a tractor parking brake and a park brake port 22 (also see FIGS. 2-7) of the hand control valve 14. With sufficient pressure in the air line 20, parking brakes on a tractor portion of the vehicle are not engaged and the hand control valve 14 cannot be latched into a position for actuating service brakes on the vehicle. Without pressure in the air line 20, parking brakes on a tractor portion of the vehicle are engaged and the hand control valve 14 may be latched into the position for actuating service brakes on the vehicle. Operation of the hand control valve 14 in response to pressure in the air line 20 is discussed in more detail below.

Figure 4:
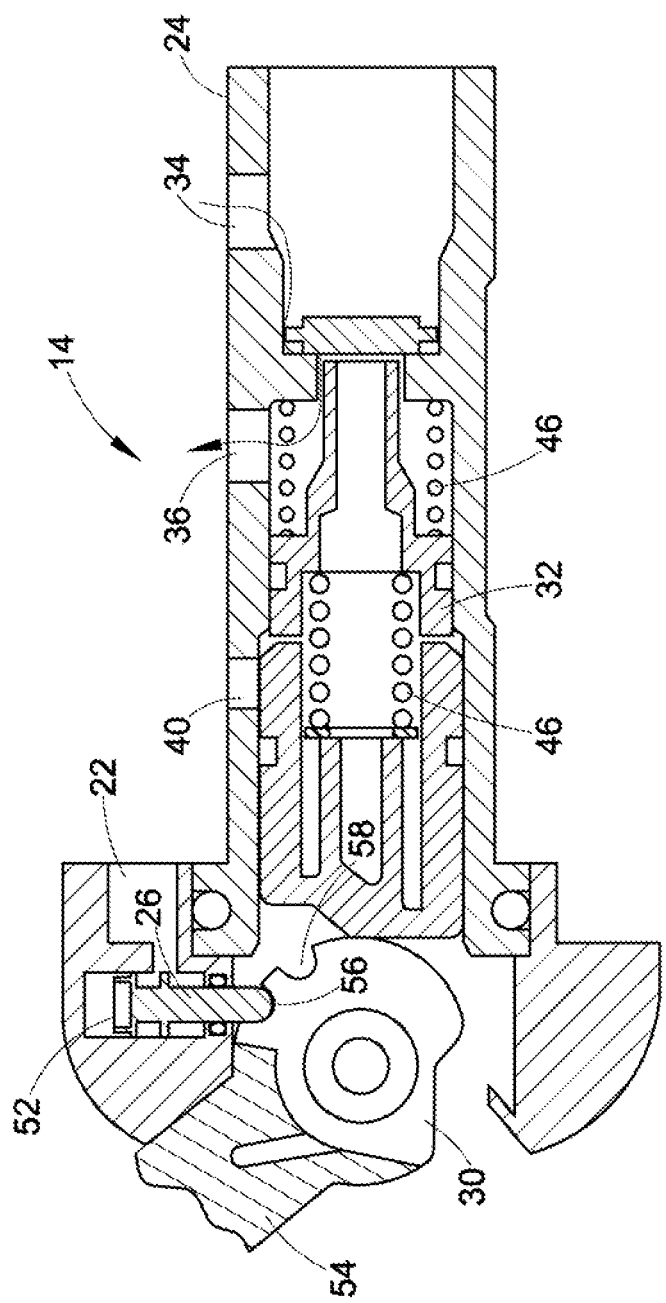
FIG. 4 illustrates a simplified component diagram of an exemplary tractor hand control valve in a latched delivery position in accordance with the first embodiment of an apparatus illustrating principles of the present invention.

FIGS. 2-4 illustrate simplified component diagrams of an exemplary hand control valve 14, in various stages of deactuation/actuation, for a vehicle in accordance with one embodiment of the present invention.

The hand control brake valve 14 includes a housing 24, a piston 26, a control mechanism 30, and a service brake actuation valve 32. The control mechanism 30 mechanically interacts with the service brake actuation valve 32 to set a position of the service brake actuation valve 32 in the housing 24.

The hand control brake valve 14 also includes various ports for communicating pressurized fluid (e.g., air). For example, the control brake valve 14 includes a supply port 34, which receives pressurized fluid from a source (e.g., reservoir) (not shown) on the vehicle, a delivery port 36, an exhaust port 40, and the park brake port 22. The delivery port 36 fluidly communicates with the supply port 34 or the exhaust port 40 based on a position of the service brake actuation valve 32 in the housing 24. In FIG. 2, the service brake actuation valve 32 is set to a de-actuation position in the housing 24 so that the delivery port 36 fluidly communicates with the exhaust port 40 via a path 42. In FIGS. 3 and 4, the service brake actuation valve 32 is to set a actuation position in the housing 24 so that the delivery port 36 alternately fluidly communicates with the supply port 34 via a path 44 and the exhaust port 40 via the path 42 to maintain a predetermined level of pressure at the delivery port 36.

With reference again to FIGS. 1-4, the piston 26 is biased by a spring 52 to a downward position (e.g., a parking brake engaged position) (see FIG. 4) when no pressure exists at the park brake port 22 (i.e., the vehicle, or tractor, park brakes are engaged). When the park brakes are released, pressure is available at the park brake port 22 that positions the piston 26 to an upward position (e.g., a parking brake disengaged position) (see FIGS. 2 and 3).

With the piston 26 in the upward position (see FIGS. 2 and 3) (since the park brakes are released), the control mechanism 30 may be moved (e.g., rotated) freely by a user via a handle 54 from a release position (FIG. 2) to a full delivery position (FIGS. 3 and 4). In the release position (FIG. 2), the control mechanism 30 is positioned to allow the service brake actuation valve 32 to shift leftward toward the control mechanism 30. In the full delivery position (FIGS. 3 and 4), control mechanism 30 is positioned to shift the service brake actuation valve 32 rightward away from the control mechanism 30.

While the piston 26 is in the upward position (FIGS. 2 and 3) (since the park brakes are released), a bias of the service brake actuation valve 32 leftward forces the control mechanism 30 to return to the release position (FIG. 2) after a user actuates, by rotating, pushing or other means, and then releases, the handle 54 of the control mechanism 30 to the full delivery position (FIG. 3). Therefore, while the piston 26 is in the upward position (FIGS. 2 and 3), the piston 26 is positioned to prevent engagement with the control mechanism 30. In this manner, the piston 26 positioned relative to the control mechanism 30 acts as a means for preventing the control mechanism 30 from latching in the latch position when the parking brake is not engaged.

While the piston 26 is in the downward position (FIG. 4) (since the park brakes are engaged), once the handle 54 of the control mechanism 30 is rotated to the full delivery position (FIG. 4), the piston 26 matingly engages the control mechanism 30 (e.g., via an engagingly sized notch 56 along the outer circumference of the control mechanism 30) to releasably latch the control mechanism 30 in a first rotational position (even after the user releases the handle 54). The control mechanism 30 is "releasably" latched since the user may apply force to the handle 54 to unlatch the control mechanism 30 and return the control mechanism 30 to another rotational position (e.g., the release position (FIG. 2)). In an alternate embodiment, a second notch 58 may be located along the outer circumference of the control mechanism 30 to provide the releasable latching feature while the control mechanism 30 is at a second rotational position. The second notch 58 is engagingly sized to releasably latch with the piston 26 at the second rotational position. For example, the user may partially rotate the handle to the second rotational position with the intent to engage the trailer service brakes at a pressure less than full pressure.

If the park brakes are released while the control mechanism 30 is latched in the latch position, the increased pressure at the park brake port 22 urges the piston 26 upward to disengage from the control mechanism 30. Once the piston 26 becomes disengaged from the control mechanism 30, the bias of the service brake actuation valve 32 leftward returns the control mechanism 30 to the release position (FIG. 2).

The control mechanism 30 is referred to as being in a latch position when in the full delivery position. Therefore, the control mechanism 30 is in the latch position in both FIGS. 3 and 4, but is latched in the latch position only in FIG. 4. It is to be understood that the control mechanism 30 is capable of being latched in the latch position to set the service brake actuation valve to actuate the vehicle service brakes when the piston is positioned in the parking brake engaged position.

Figure 7:
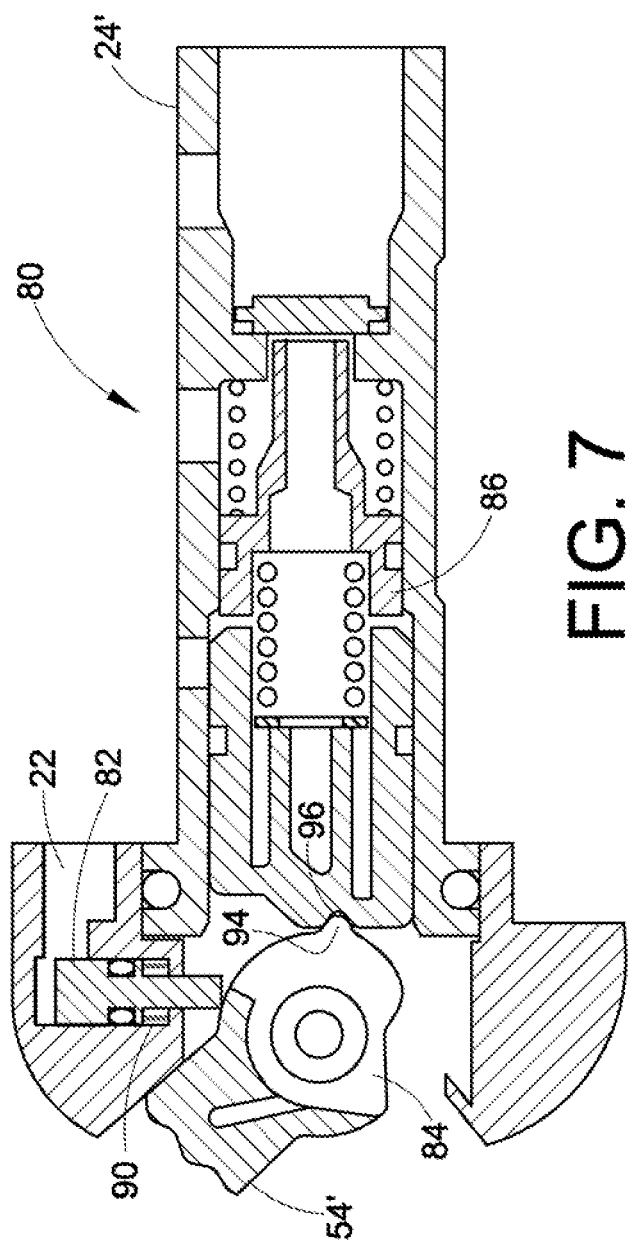
FIG. 7 illustrates a simplified component diagram of an exemplary tractor hand control valve in a latched delivery position in accordance with the second embodiment of an apparatus illustrating principles of the present invention.

FIGS. 5-7 illustrate a second embodiment of simplified component diagrams of an exemplary hand control valve 80, in various stages of deactuation/actuation, for a vehicle in accordance with one embodiment of the present invention. For ease of understanding this embodiment of the present invention, like components are designated by like numerals with a primed (') suffix and new components are designated by new numerals.

With reference to FIGS. 1 and 5-7, the hand control brake valve 80 includes a housing 24', a piston 82, a control mechanism 84, and a service brake actuation valve 86. The control mechanism 84 mechanically interacts with the service brake actuation valve 86 to set a position of the service brake actuation valve 86 in the housing 24'.

The piston 82 is biased by a spring 90 to an upward position (e.g., a parking brake engaged position) (see FIG. 7) when no pressure exists at the park brake port 22' (i.e., the park brakes are engaged). When the park brakes are released, pressure is available at the park brake port 22' that positions the piston 82 to a downward position (e.g., a parking brake disengaged position) (see FIGS. 5 and 6).

With the piston 82 in the downward position (see FIGS. 5 and 6) (since the park brakes are released), the control mechanism 84 may be rotated freely by a user via the handle 54' from the release position (FIG. 5) toward (but not completely to) the full delivery position shown in FIG. 7. More specifically, the control mechanism 84 may be rotated to a predetermined position shown in FIG. 6, at which the piston 82 abuts a portion 92 (FIG. 6) of the handle 54' that acts as a stop to the piston 82. In the release position (FIG. 5), the control mechanism 84 is positioned to allow the service brake actuation valve 86 to shift leftward toward the control mechanism 84. In the predetermined position (FIG. 6) and the full delivery position (FIG. 7), control mechanism 84 is positioned to shift the service brake actuation valve 86 rightward away from the control mechanism 84.

While the piston 82 is in the downward position (FIGS. 5 and 6) (since the park brakes are released), the bias of the service brake actuation valve 86 leftward forces the control mechanism 84 to return to the release position (FIG. 5) after a user rotates, and then releases, the handle 54' of the control mechanism 84 to the predetermined position (FIG. 6). Therefore, while the piston 82 is in the downward position (FIGS. 5 and 6), the piston 82 is positioned to engage the control mechanism 84 before the control mechanism 84 can be latched. In this manner, the piston 82 positioned relative to the control mechanism 84 acts as a means for preventing the control mechanism 84 from latching in the latch position when the parking brake is not engaged.

While the piston 82 is in the upward position (FIG. 7) (since the park brakes are engaged), the handle 54' of the control mechanism 84 may be rotated past the predetermined position (FIG. 6) to the full delivery position (FIG. 7). When the handle 54' is in the full delivery position (FIG. 7), a detent 94 of the control mechanism 84 matingly engages a notch 96 of the service brake actuation valve 86 to releasably latch (maintain) the control mechanism 84 even after the user releases the handle 54'. The control mechanism 84 is "releasably" latched since the user may apply force to the handle 54' to unlatch the control mechanism 84 and return the control mechanism 84 to the release position (FIG. 5).

In this embodiment, the control mechanism 84 is referred to as being in the latch position only when in the full delivery position (FIG. 7). Therefore the control mechanism 84 is latched in the latch position in FIG. 7. It is to be understood that the control mechanism 84 is capable of being latched in the latch position to set the service brake actuation valve to actuate the vehicle service brakes when the piston is positioned in the parking brake engaged position.

Figure 8:
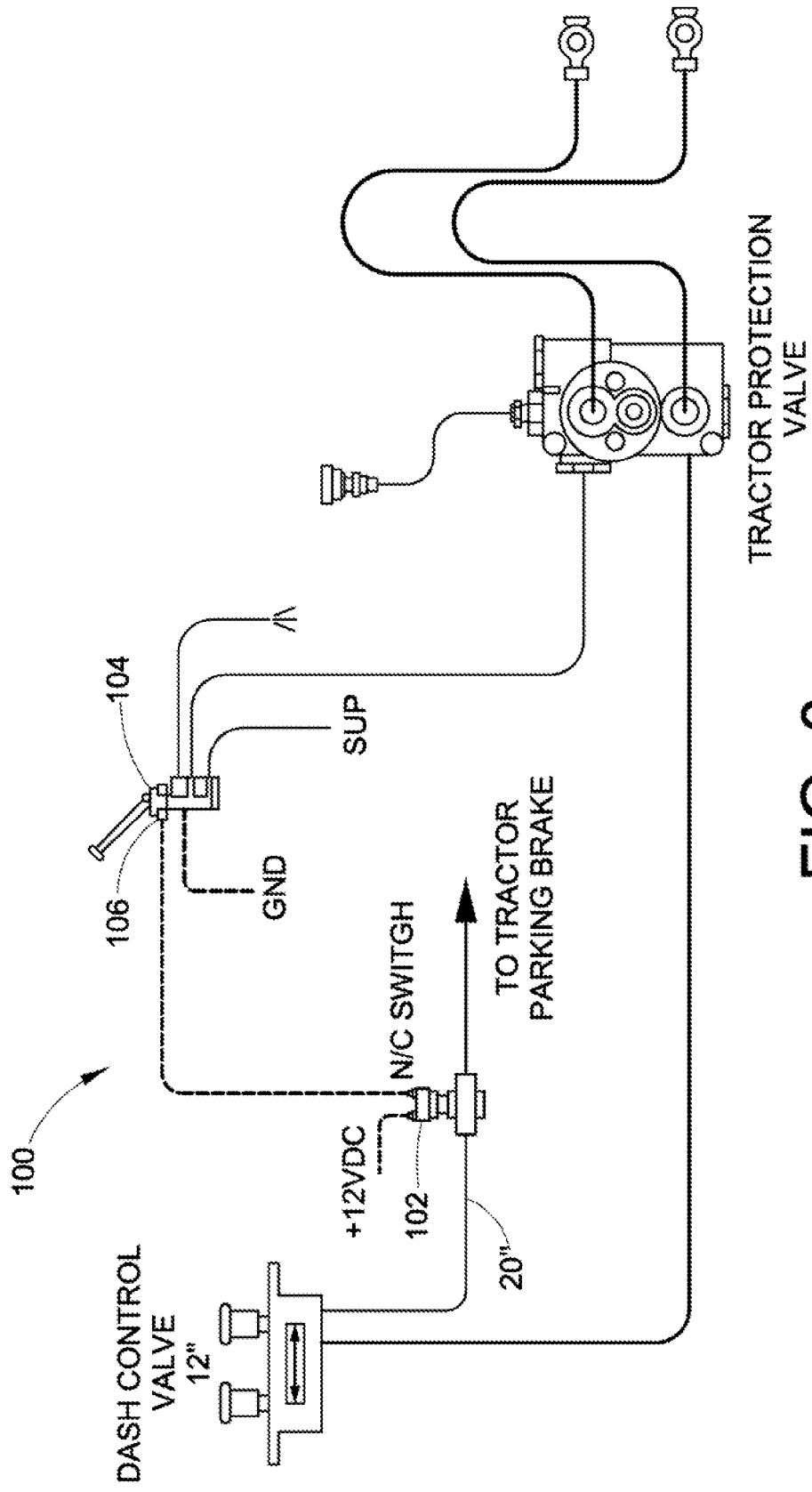
FIG. 8 illustrates a simplified component diagram of an exemplary brake system in accordance with another embodiment of an apparatus illustrating principles of the present invention.

With reference to FIG. 8, a simplified component diagram of an exemplary brake system 100 of a vehicle is illustrated in accordance with a second embodiment of the present invention. For ease of understanding this embodiment of the present invention, like components are designated by like numerals with a double-primed (") suffix and new components are designated by new numerals.

In the embodiment illustrated in FIG. 8, a pneumatically controlled switch 102 is included in the air line 20" from the delivery port of the dash control valve 12". Instead of the park brake port 22 (see FIG. 1), the hand control brake valve 104 includes a park brake electrical input 106. It is contemplated that the park brake electrical input 106 includes circuitry for controlling a piston according to the various embodiments described above in FIGS. 2-7. In addition, instead of the air line 20 (see FIG. 1) fluidly communicating with the park brake port 22 (see FIG. 1) of the hand control valve 14 (see FIG. 1), the air line 20" fluidly communicates with the switch 102 which, in turn, electrically communicates with the park brake electrical input 106 (FIG. 8).

In the embodiment of FIG. 8, the switch 102 transmits an electrical signal to the park brake electrical input 106 based on a pressure in the air line 20". Electrical circuitry in the hand control brake valve 80 responds to the electrical signal to set the piston in either the upward or downward position according to the various embodiments described above in FIGS. 2-7. Since the pressure in the air line 20" is based on engagement of the vehicle (e.g., tractor) parking brakes, the signal transmitted to the park brake electrical input 106 is also based on engagement of the parking brakes. In this manner, the pressure in the air line 20" controls whether the hand control brake valve 80 may be latched to actuate the service brakes based on whether the parking brakes are engaged.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A vehicle hand control brake valve, comprising:
   a piston positioned based on an engagement of a vehicle parking brake;
   a service brake actuation valve;
   a control mechanism mechanically interacting with the service brake actuation valve to set a position of the service brake actuation valve, a level of actuation of vehicle service brakes being set based on the position of the service brake actuation valve, the service brake actuation valve being set to a position to actuate the service brakes when the control mechanism is set to a latch position based on a position of the piston, and the control mechanism only being latched in the latch position when the vehicle parking brake is engaged; and
   a port receiving a fluid pressure signal based on the engagement of the vehicle parking brake, the fluid pressure signal positioning the piston relative to the control mechanism.

2. The vehicle hand control brake valve as set forth in claim 1, wherein:
   the control mechanism is latched in the latch position by matingly engaging the piston.

3. The vehicle hand control brake valve as set forth in claim 2, wherein:
   the control mechanism includes a notch sized for matingly engaging the piston to latch the control mechanism at a first rotational position.

4. The vehicle hand control brake valve as set forth, in claim 3, wherein
   the control mechanism includes a second notch sized for matingly engaging the piston to latch the control mechanism at a second rotational position.

5. The vehicle hand control brake valve as set forth in claim 2, wherein:
   when the vehicle parking brake is not engaged, the piston is disengaged from the control mechanism.

6. The vehicle hand control brake valve as set forth in claim 1, wherein:
   the control mechanism is releasably latched in the latch position.

7. The vehicle hand control brake valve as set forth in claim 1, wherein:
   the control mechanism matingly engages the service brake actuation valve when the control mechanism is latched.

8. The vehicle hand control brake valve as set: forth in claim 7, wherein:
   the control mechanism includes a detent; and
   the service brake actuation valve includes a notch, the control mechanism detent matingly engaging the service brake actuation valve notch when the control mechanism is latched.

9. The vehicle hand control brake valve as set forth in claim 8, wherein:
   the mating engagement between the detent and the notch maintains the control mechanism releasably latched in the latch position.

10. The vehicle hand control brake valve as set forth in claim 1, wherein
    the control mechanism is rotatable; and
    when the vehicle parking brake is not engaged, the piston is positioned to prevent rotation of the control mechanism to the latch position.

11. The vehicle hand control brake valve as set forth in claim 10, wherein:
    the piston prevents rotation of the control mechanism to the latch position by engaging the control mechanism as the control mechanism is rotated toward the latch position and to a predetermined position.

12. A vehicle hand control brake valve, comprising:
    a service brake actuation valve, a level of actuation of vehicle service brakes being set based on a position of the service brake actuation valve;
    a control mechanism movable to different positions, the position of the service brake actuation valve being set based on the position of the control mechanism;
    a piston positioned relative to the control mechanism based on an engagement of a vehicle parking brake, the control mechanism capable of being latched in a latch position to set the service brake actuation valve to actuate the vehicle service brakes when the piston is positioned in a vehicle parking, brake engaged position; and a port receiving a fluid pressure signal based on the engagement of the vehicle parking brake, the fluid pressure signal positioning the piston relative to the control mechanism.

13. The vehicle hand control brake valve as set forth in claim 12, wherein:
when the vehicle parking brake is engaged and when the control mechanism is in the latch position, the piston is in the vehicle parking brake engaged position and latchingly engages the control mechanism.

14. The vehicle hand control brake valve as set forth in claim 13, wherein:
when the vehicle parking brake is disengaged, the piston is positioned in a vehicle parking brake disengaged position and is disengaged from the control mechanism to prevent the control mechanism from being latched in the latch position.

15. The vehicle hand control brake valve as set forth in claim 12, wherein:
when the piston is in a vehicle parking brake disengaged position, the piston is disengaged from the control mechanism to prevent the control mechanism being, set to the latch position.

16. The vehicle hand control brake valve as set forth in claim 12, wherein:
the control mechanism engagingly moves the service brake actuation valve to actuate the vehicle service brakes as the control mechanism is moved to the latch position.

17. A vehicle hand control brake valve, comprising:
a service brake actuation valve, a level of actuation of vehicle service brakes being set based on a position of the service brake actuation valve;
a control mechanism movable to different positions, the position of the service brake actuation valve being set based on the position of the control mechanism, the service brake actuation valve being set to an actuation position for actuating the vehicle service brakes when the control mechanism is in a latch position;
means for preventing the control mechanism from latching in the latch position when a vehicle parking brake is not engaged; and
a port receiving a fluid pressure signal based on the engagement of the vehicle parking brake, the fluid pressure signal positioning the means for preventing relative to the control mechanism.

18. The vehicle hand control brake valve as set forth in claim 17, wherein the means for preventing, includes:
a piston positioned relative to the control mechanism based on the engagement of the vehicle parking brake.

19. The vehicle hand control brake valve as set forth in claim 18, wherein:
when the vehicle parking brake is not engaged, the piston engages the control mechanism as the control mechanism is moved toward the latch position to prevent the control mechanism from reaching the latch position.

20. The vehicle hand control brake valve as set forth in claim 19, wherein:
when the vehicle parking brake is engaged, the control mechanism matingly engages the service brake actuation valve to maintain the control mechanism in the latch position.

21. The vehicle hand control brake valve as set forth in claim 18, wherein:
when the vehicle parking brake is engaged, the piston engages the control mechanism to maintain the control mechanism in the latch position.

\* \* \* \* \*